United States Patent Office 3,808,331
Patented Apr. 30, 1974

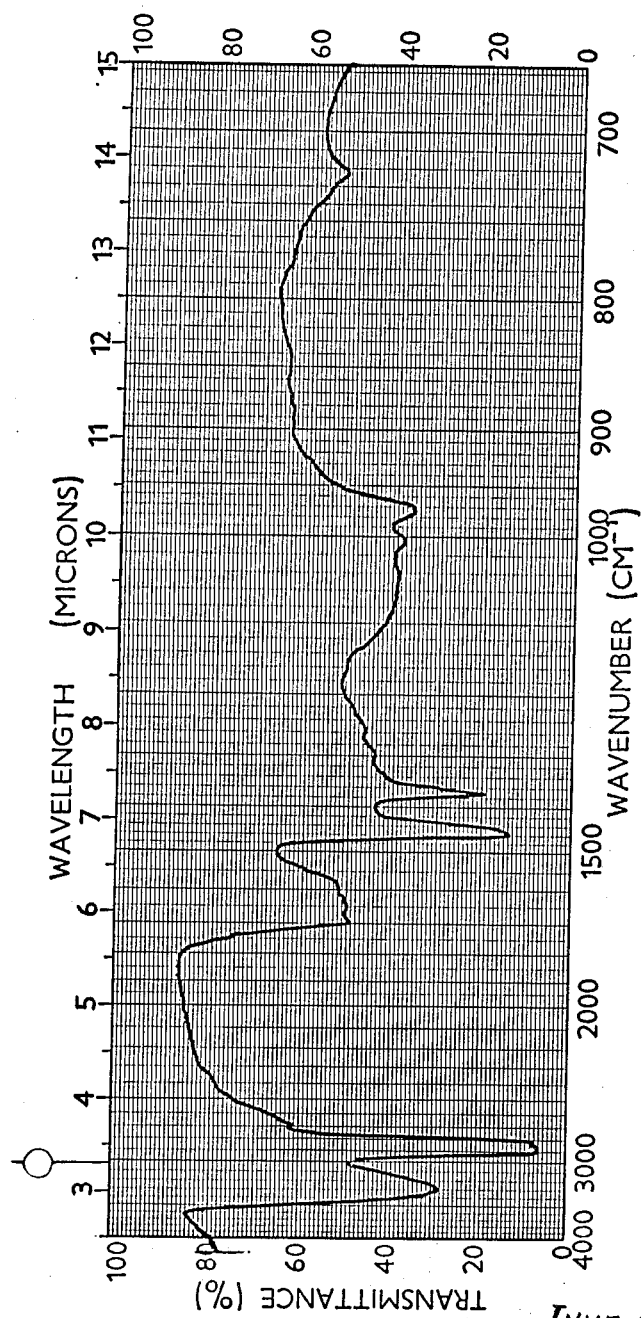

3,808,331
TETRAHEXIN AND PROCESS FOR PREPARING SAME
Renato Craveri, Carolina Cornelli, and Piero Sensi, Milan, Italy, assignors to Lepetit, S.p.A., Milan, Italy
Continuation-in-part of abandoned application Ser. No. 266,182, Mar. 19, 1963. This application Nov. 28, 1967, Ser. No. 686,197
Int. Cl. A61k 21/00
U.S. Cl. 424—122
3 Claims

ABSTRACT OF THE DISCLOSURE

The antibiotic substance tetrahexin, of polyenic nature, of high activity against pathogenic microorganisms, and the method of preparation of the same.

This is a continuation-in-part of our copending application Ser. No. 266,182 filed on Mar. 19, 1963, now abandoned.

This invention relates to a new antibiotic substance and to the process for preparing it.

More particularly the invention is concerned with tetrahexin.

The process for producing tetrahexin comprises cultivating a strain of Streptomyces ATCC 14972 hereinafter described, in a culture medium containing assimilable sources of carbohydrates, nitrogen, and inorganic salts until substantial antibiotic activity is imparted to the culture medium, and recovering tetrahexin from the medium.

The strain Streptomyces ATCC 14972 has been isolated from a sample of soil collected in a chestnut wood in the surrounding of Genoa ad shows the characteristics hereinbelow described.

General characteristic

The colonies on solid medium appear powdery, often with wrinkled surface, of dark gray color, with diffused violet brown pigment. The hyphae of the ripened aerial mycelium become spirals of spore chains with many closed rings. The spores are cylindric in form and measure 2–2.5$\mu$ x 1–1.5$\mu$. According to the classification of Pridham, Heseltine and Benedict the strain belongs to the "gray" series and to the "spira" section.

Physiological and cultural characteristics

The strain mesophilic and its growth requires: minimum 12–14° C., optimum 20–26° C. for the development of the vegetative mycelium and 26–32° C. for the sporification, maximum 34–36° C. It does not develop at pH 4.5 and 9, and has a growth optimum at about pH 7.

Table I presents the general physiological and culture characteristics of the strain, while Table II indicates the utilization of various carbon sources using the base synthetic medium and the method of Pridham and Gottlieb. The reported results were obtained after 15 days of incubation at 28° C.

TABLE I

| Culture medium | Vegetative mycelium | Aerial mycelium | Soluble pigment | Biochemical properties |
|---|---|---|---|---|
| Agal [1] | Good growth, from intense violet to blackish brown. | Ash gray, moderate sporification. | From intense violet to dark brown well diffused. | |
| Bennet's agar | Good growth, brown | Absent | Brown | |
| Hickey-Tresner's agar | do | Grayish white, poor sporification. | do | |
| Oatmeal agar | Good growth, from violet to brown. | Ash gray, abundant sporification. | From lavender-gray to brownish, well diffused. | |
| Czapek-glucose agar | Good growth, light brown | Absent | Absent | |
| Nutrient agar | Moderate growth colorless | do | do | |
| Nutrient glucose agar | Good growth, light brown | do | do | |
| Roux potato agar | Good growth, colorless | do | do | |
| Roux carrot agar | Moderate growth, coloress | do | do | |
| Skim-milk agar BBL | do | do | do | Poor hydrolysis of casein. |
| Peptone-iron agar Difco | Poor growth, brownish | do | Brownish | Poor production of hydrogen sulfide. |
| Synthetic-agar tyrosine | Poor growth, colorless | do | Absent | Not decomposed tyrosine. |
| Agal-tyrosine | Good growth, violet brown | Grayish, poor sporification | Dark brown well diffused | Weak attack of tyrosine with some production of melanoid pigment. |
| Synthetic agar cellulose | Poor growth, colorless | Absent | Absent | Not decomposed cellulose |
| Agal-cellulose | Good growth, blacksh brown | Ash gray, poor sporification. | Initially violet, then dark brown. | Do. |
| Ca-malate agar | Good growth, violet brown | Gray, poor sporification | Violet brown, poorly diffused. | Not decomposed Camalate. |
| Nitrates broth, synthetic | Very poor growth | Absent | Absent | Nirates not reduced to nitrites. |
| Gelatine | Poor surface growth | do | Brown | Not fluidified gelatine. |
| Agal-uric acid | Good growth violet | Gray, poor sporification | Intense violet well diffused | Decomposed uric acid. |
| Litmus-milk Difco | Good surface growth | Absent | Not evident | Positive peptonization, negative coagulation, pH 8. |

[1] Agal=Asparagine 1 g.; yeast extract Difco 1 g.; glycerol 5 g.; soluble starch 10 g.; agar 20 g.; distilled water 1,000 ml.; pH 7.2.

TABLE II

| Carbon source | Growth | Sporification |
|---|---|---|
| Arabinose | Absent | Absent. |
| Xylose | do | Do. |
| Fructose | do | Do. |
| Glucose | Abundant | Poor. |
| Galactose | Absent | Absent. |
| Mannose | Abundant | Abundant. |
| Ramnose | Absent | Absent. |
| Lactose | do | Do. |
| Maltose | Abundant | Poor. |
| Sucrose | Absent | Absent. |
| Raffinose | do | Do. |
| Starch | Abundant | Poor. |
| Dextrine | do | Absent. |
| Inulin | Absent | Do. |
| Glycerol | Abundant | Poor. |
| Dulcitol | Absent | Absent. |
| Mannitol | do | Do. |
| Sorbitol | do | Do. |
| Inositol | do | Do. |

The new antibiotic is produced in high yield by submerged culture in fermentor and is recovered from the mycelium by extraction with a lower alkanol. The product is purified by counter-current distribution or solution in acetic acid and precipitation by neutralization with sodium hydroxide from the cooled solution diluted 10:1 with water.

Tetrahexin is soluble in dimethylformamide and acetic acid, scarcely soluble in lower alkanols (the solubility can be increased by adding to the alkanol 1–2% of calcium chloride) and in water at pH lower than 3 and higher than 9; insoluble in the other usual organic solvents, such as diethyl ether, acetone, chloroform, benzene, and the like, and in water at pH 3–9. The antibiotic does not melt below 250° C. and decomposes above this temperature.

Tetrahexin is of polyenic nature and is amphoteric; the $pK_a$ of the two salificable functions as determined by spectrophotometry are 5.1 and 6.8. The antibiotic contains nitrogen and is free from sulfur and halogens; it gives negative reaction to anthrone and ninhydrine, also after acid and alkaline hydrolysis, positive to Tollens and Fehling reagets. It gives brown coloration with ferric chloride and intense red-violet coloration with concentrated sulfuric acid (reaction of polyenic substances).

The elemental analysis carried out on samples purified from acetic acid to constant extinction values at the UV spectrum gives the following percent values: C, 65.55; H, 8.46; N, 1.32; O, 24.67 (by difference).

The antibiotic tetrahexin shows in the UV a characteristic absorption spectrum with maximum values at 268 m$\mu$ ($E_{1cm}^{1\%}$=440), 350 m$\mu$ ($E_{1cm}^{1\%}$=466), 318 m$\mu$ ($E_{1cm}^{1\%}$=630), 304 m$\mu$ ($E_{1cm}^{1\%}$=616), 290 m$\mu$ ($E_{1cm}^{1\%}$=420)

and a shoulder at 335 m$\mu$. The maximum values of the UV spectrum indicate the presence of a tetraenic and hexaenic chromophore.

In the I.R. region of the spectrum, which is reported in FIG. 1, tetrahexin shows absorption maxima at the following wavelengths, indicated in cm.$^{-1}$: 3300, 1700, 1650, 1625, 1600, 1295, 1255, 1043, 1003, 973, 723. The spectrum was determined in a Perkin-Elmer apparatus on a sample suspended in mineral oil.

Samples of crude and purified product were subjected to paper chromatography using several solvent mixtures and the streaks were developed microbiologically on plates inoculated with *Saccharomyces cerevisiae* and *Staphylococcus aureus*, with all solvents systems mixtures only one inhibition one was noted and the obtained Rf values were identical with both microorganisms. The obtained results are summarized in Table III.

TABLE III

| Solvent mixture | Rf S. cerevisiae | Rf S. aureus |
|---|---|---|
| Water saturated butanol | 0.79 | 0.79 |
| Water saturated butanol plus 2% p-toluenesulfonic acid | 0.44 | 0.45 |
| Water saturated butanol plus 2% NH$_4$OH | 0.17 | 0.14 |
| Butanol-acetic acid water 2:1:1 | 0.90 | 0.92 |
| Butanol-ethanol-water 5:1:4 | 0.77 | 0.75 |
| Butanol saturated water | 0.80 | 0.79 |
| Acetone-water 1:1 | 0.84 | 0.81 |

Several counter-current purification assays were made with two mixtures: (A) pyridine-ethyl acetate-water (3.5:6.5:8.3), (B) butano-ligroin-phosphate buffer pH 9.2-dimethylformamide-methanol (3:0.6:3:0.8:0.6). From the distribution curves it results that only one fraction was separated with both mixtures and that the highest microbiologic activity is the one spectrophotometrically calculated both at 318 m$\mu$ (characteristic maximum of the tetraenic chromophoric group) and at 350 m$\mu$ (characteristic maximum of the hexaenic chromophoric group).

The test tubes corresponding to the maximum of the counter-current distribution performed with mixture B were combined and a product was isolated which was subsequently submitted to 200 transfers with mixture A; the distribution curve shows again the presence of only one maximum.

Both from chromatography and counter-current distribution tetrahexin appears as a unitary antibiotic substance containing both the tetraenic and hexaenic chromophoric groups.

Tetrahexin is stable for several months if preserved dry and in the dark. In aqueous solutions it is stable for some days only if stored in the dark at pH over 7. The bovine serum does not alter its microbiological activity.

Tetrahexin is highly active against yeasts, moulds and gram-positive bacteria. It possesses no activity against gram-negative bacteria.

The antibiotic activity of tetrahexin as determined by the agar streak method is shown in Table IV.

The antibiotic is dissolved in dimethylformamide and the solutions to be used are consecutively prepared with distilled water and polyvinylpyrrolidine 100:5. The used medium is "pluriagar" as described by Craveri et al., in Antibiotics and Chemotherapy 10, 430 (1960).

The given results were obtained after incubation at 28° C. for the test microorganisms: 24 hours for bacteria and yeasts, 48 hours for filamentous fungi.

TABLE IV

| Microorganisms | Minimal concentration of complete inhibition $\gamma$/ml. |
|---|---|
| Saccharomyces cerevisiae | 0.05 |
| Saccharomyces carlsbergensis | 0.05 |
| Saccharomyces ellipsoideus | 0.05 |
| Saccharomyces ludwigii | 0.05 |
| Kloechera brevis | 0.05 |
| Torula utilis | 0.25 |
| Rodotorula sp. | 0.25 |
| Zygosaccharomyces globiformis | 0.1 |
| Swannomyces occidentalis | 0.25 |
| Cryptococcus neoforman | 0.25 |
| Candida albicans | 0.25 |
| Candida cruzei | 0.5 |
| Alternaria solani | 0.1 |
| Alternaria citri | 0.1 |
| Penicillium chrysogenum W-Q 176 | 0.25 |
| Aspergillus niger | 0.25 |
| Fusarium oxysporum var. lycopersici | 0.5 |
| Rizoctonia solani | 0.25 |
| Cercospora acetosella | 0.25 |
| Trichophyton mentagrophytes | 0.25 |
| Trichosporon cutaneum | 0.1 |
| Histoplasma capsulatum | 0.25 |
| Nocardia asteroides | 0.25 |
| Nocardia lutea | 0.1 |
| Bacillus subtilis | 0.05 |
| Bacillus cereus var. mycoides | 0.1 |
| Staphylococcus aureus Oxf. | 0.05 |
| Sarcina lutea | 0.1 |
| Corynebacterium equi | 0.1 |
| Escherichia coli | 200 |
| Salmonella typhi-murium | 200 |
| Klebsiella pneumoniae | 200 |
| Proteus vulgaris | 200 |

The addition of bovine blood serum to the culture medium of pathogenic microorganisms does not impair the in vitro activity of tetrahexin, thus showing that the new antibiotic is effective also in the presence of body fluids. The following table gives the m.i.c. against some microorganisms in the presence of 20 percent bovine serum at pH 7.0 at 22° C. after 7 hours.

| | |
|---|---|
| Saccharomyces cerevisiae | 0.15 |
| Candida albicans | 0.15 |
| Staphylococcus aureus Oxf. | 0.15 |
| Cryptococcus neoformans | 0.15 |

Tetrahexin possesses a low degree of toxicity on animals. The acute toxicity data are hereinafter given in comparison with a widely used antibiotic substance of polyenic nature, i.e. trichomycin.

$LD_{50}$ on albino mice, in mg./kg.

| | Subcutaneously | Intraperitoneally |
|---|---|---|
| Tetrahexin | 400 | 40 |
| Trichomycin | 160 | 4.2 |

Contrary to other antibiotics of polyenic nature, tetrahexin is fairly stable at various pH values and temperatures.

Solutions containing 200 γ/ml. of tetrahexin were prepared in a solvent consisting of 10 percent dimethylformamide, 20 percent methanol and 70 percent buffer at various pH. The m.i.c. was then determined on four selected microorganisms at different pH values and temperatures. The obtained results are recorded in the following table.

| Sample | M.i.c. in γ/ml. | | | |
|---|---|---|---|---|
| | Saccharomyces cerevisiae | Candida albicans | Staph. aureus | Cryptococcus neoformans |
| Control solution at hour 0 (zero) pH 7.0 | 1.25–0.6 | 2.5–1.25 | 0.6–0.3 | 0.6–1.25 |
| 1. Stability at various pH values: | | | | |
| pH 2.0 at 22° C., 7th hour | 5–2.5 | 10 | 5–2.5 | 10–5 |
| pH 4.5 at 22° C., 7th hour | 0.6–0.3 | 2.5–1.25 | 0.6–0.3 | 0.6–0.3 |
| pH 5.9 at 22° C., 7th hour | 0.3 | 0.6 | 0.3–0.15 | 0.3–0.15 |
| pH 7.0 at 22° C., 7th hour | 0.3 | 1.25–0.6 | 0.6–0.3 | 0.6–0.3 |
| pH 8.0 at 22° C., 7th hour | 0.6–0.3 | 1.25–0.6 | 0.6–0.3 | 0.6–0.3 |
| pH 9.2 at 22° C., 7th hour | 0.6–0.3 | 1.25–0.6 | 0.6 | 0.6 |
| 2. Stability at various temperatures: | | | | |
| pH 7.0 at 37° C., 7th hour | 0.6–0.3 | 1.25–0.6 | 0.3 | 0.3 |
| pH 7.0 at 50° C., 7th hour | 0.6–0.3 | 1.25–0.6 | 0.6–0.3 | 0.6–0.3 |
| pH 7.0 at 22° C., 7th hour | 1.25–0.6 | 2.5–1.25 | 0.6 | 1.25–0.6 |
| pH 7.0 at 22° C., 1 week | 1.25–0.6 | 2.5–1.25 | 1.25–0.6 | 0.6–0.3 |
| pH 7.0 at 22° C., 1 month | 20–10 | 20–10 | 10–5 | 5 |
| pH 7.0 at 22° C., 3 months | 5–2.5 | 5–2.5 | 5–2.5 | 5–2.5 |
| pH 7.0 at 4° C., 1 week | 1.25–0.6 | 1.25 | 2.5–1.25 | 1.25–0.6 |
| pH 7.0 at 4° C., 1 month | 5 | 2.5 | 2.5 | 2.5–1.25 |
| pH 7.0 at 4° C., 3 months | (¹) | (¹) | (¹) | (¹) |

¹ Inactive at 20 γ/ml.

The following nonlimitative example illustrate the invention.

EXAMPLE

Five hundred millilitres flasks containing 100 ml. of medium A:

| | | |
|---|---|---|
| Yeast autolysate | g | 5 |
| Meat extract | g | 5 |
| Peptone | g | 5 |
| Casein hydrolysate | g | 3 |
| Glucose | g | 20 |
| NaCl | g | 1.5 |
| Distilled water | ml | 1000 | pH after sterilization 6.8.

are inoculated with a spore suspension of Streptomyces ATCC 14972 after 48 hours of rotatory stirring at 28° C. and 250 r.p.m. the culture is used for inoculating 10 litre fermentors containing 4 litres of medium A.

After 24 hours fermentation (stirring 800 r.p.m., aeration 1 v./v./m., temperature 24° C.) a fermentor is used as inoculum for five 20 litres production fermentors containing 10 litres of medium B:

| | | |
|---|---|---|
| Corn steep | g | 20 |
| Soya meal | g | 5 |
| Glucose | g | 50 |
| (NH₄)₂SO₄ | g | 6 |
| CaCO₃ | g | 9 |
| MgSO₄·7H₂O | g | 1 |
| CuSO₄·5H₂O—0.5% | ml | 1 |
| FeSO₄·7H₂O—0.1% | ml | 1 |
| ZnSO₄·7H₂O—0.2% | ml | 1 |
| MnSO₄ 0.8% | ml | 1 |
| Distilled water | ml | 1000 | pH after sterilization 6.6.

(stirring 1200 r.p.m., aeration 1.5 v./v./m. temperature 20° C.). After 80–85 hours fermentation the antibiotic concentration is assayed microbiologically on an ethanol extract of the mycelium (after filtration of the broth culture about 90% of the produced active substance is retained in the mycelium) and shows 14–16.000 dilution units on *Saccharomyces cerevisiae* ATCC 9763 and on *Staphylococcus aureus* 209 P. ATCC 6538 (assay method: agar streak).

The mycelium is separated by filtration at neutral pH with the addition of Celite, washed with water and dried under pressure. The obtained mass is extracted three times with ethanol and the combined ethanol extracts are concentrated in vacuo to ⅓ of the initial volume and allowed to stand 1 night at 40 C. The formed precipitate is filtered, thoroughly washed with acetone and dried in vacuo. From the mother liquors, by further concentration and cooling at 4° C. for 24 hours it is possible to obtain a second crop of antibiotic. From 10 litres of fermentation broth assaying 14–16.000 dilution units 6.5 g. of active product, active at 0.5 γ/ml. on *Saccharomyces cerevisiae* are obtained.

We claim:

1. A process for preparing an antibiotic substance of polyenic nature, named tetrahexin, having the properties indicated in claim 3, which comprises cultivating under aerobic conditions the microorganism Streptomyces ATCC 14972 in an aqueous medium containing a source of carbon, a source of nitrogen and essential inorganic salts, until substantial antibiotic activity is imparted to the medium and recovering the antibiotic from the medium.

2. A process as in claim 1, wherein Streptomyces ATCC 14972 is cultivated in an aqueous medium containing 0.1 to 5.0% by weight of a nitrogenous substance, 0.5 to 5.0% by weight of a usable carbonaceous material, at a temperature between 20° C. and 35° C. and for about 24 to 48 hours while aerating the medium.

3. An antibiotic substance, obtainable by the process defined in claim 1, said substance being named tetrahexin and being soluble in dimethylformamide and in acetic acid, poorly soluble in lower alkanols and in water at a pH lower than 3 and higher than 9, insoluble in water at pH 3 to 9, said substance being polyenic and amphoteric in nature and having two salificable functions whose pKa are 5.1 and 6.8, its elemental analysis being C, 65.55%; H, 8.46%; N, 1.32%, and O, 24.67%, giving characteristic maxima at 368 mμ

$E^{1\%}_{1cm.} = 440$; 350 mμ $E^{1\%}_{1cm.} = 466$; 318 mμ $E^{1\%}_{1cm.} = 630$; 304 mμ $E^{1\%}_{1cm.} = 616$; 290 mμ $E^{1\%}_{1cm.} = 420$;

the maximum values indicating the presence of a tetraenic and a hexaenic chromophore, said substance being active against yeast, molds, and gram-positive bacteria.

References Cited

Derwent Farm Doc. #16924, French Pat. 1,395,876, published Apr. 16, 1965, pp. 477–484 (copy in Group 120).

JEROME D. GOLDBERG, Primary Examiner

U.S. Cl. X.R.

195—80